(12) United States Patent
Hoopes (10) Patent No.: US 7,271,991 B2
(45) Date of Patent: Sep. 18, 2007

(54) PROTECTION CIRCUIT FOR SIGNAL AND POWER

(75) Inventor: Gerald B. Hoopes, Petaluma, CA (US)

(73) Assignee: Panamax, Petaluma, CA (US)

( * ) Notice: Subject to any disclaimer, the term of this patent is extended or adjusted under 35 U.S.C. 154(b) by 543 days.

(21) Appl. No.: 10/788,072

(22) Filed: Feb. 25, 2004

(65) Prior Publication Data

US 2005/0185357 A1 Aug. 25, 2005

(51) Int. Cl.
 *H02H 1/00* (2006.01)
(52) U.S. Cl. ............................................... 361/119
(58) Field of Classification Search ............. 361/111, 361/119
See application file for complete search history.

(56) References Cited

U.S. PATENT DOCUMENTS

| | | | |
|---|---|---|---|
| 3,369,153 A | 2/1968 | Arnold et al. |
| 3,693,053 A | 9/1972 | Anderson |
| 3,753,421 A | 8/1973 | Peck |
| 4,023,071 A | 5/1977 | Fussell |
| 4,089,032 A | 5/1978 | Dell Orfano |
| 4,152,743 A | 5/1979 | Comstock |
| 4,168,514 A | 9/1979 | Howell |
| 4,210,906 A | 7/1980 | Smith et al. |
| 4,249,224 A | 2/1981 | Baumbach |
| 4,317,154 A | 2/1982 | Passarella |
| 4,389,695 A | 6/1983 | Carpenter, Jr. |
| 4,438,477 A | 3/1984 | Cawley |
| 4,455,586 A | 6/1984 | McCartney |
| 4,500,862 A | 2/1985 | Shedd |
| 4,547,827 A | 10/1985 | Shedd |
| 4,616,104 A | 10/1986 | Lindsey |
| 4,626,057 A | 12/1986 | Knickerbocker |
| 4,630,163 A | 12/1986 | Cooper et al. |
| 4,642,733 A | 2/1987 | Schacht |
| 4,677,518 A | 6/1987 | Hershfield |
| 4,698,721 A | 10/1987 | Warren |
| 4,739,436 A | 4/1988 | Stefani et al. |
| 4,742,541 A | 5/1988 | Cwirzen et al. |
| 4,743,999 A | 5/1988 | Hames |
| 4,745,882 A | 5/1988 | Yarnall, Sr. et al. |
| 4,760,485 A | 7/1988 | Ari et al. |
| 4,807,083 A | 2/1989 | Austin |
| 4,835,650 A | 5/1989 | Epstein |
| 4,882,647 A | 11/1989 | Collins |
| 4,903,161 A | 2/1990 | Huber et al. |

(Continued)

*Primary Examiner*—Ronald W. Leja
(74) *Attorney, Agent, or Firm*—Hogan & Hartson LLP (57) ABSTRACT

An electrical connection box for wall mounting provides a recessed external plug for receiving or transmitting power to electronic components. The connection box is configured to receive a variety of signal connection modules for interconnecting associated audio/visual electronics such as DVD players, displays and the like in adjacent apertures. The signal connection modules are inserted or extracted from the face of the connection box; replacing blanking plates, and is optionally recessed from the face of the box into the wall cut-out. The configuration and mating features of the box and modules also provides for a common and isolated ground reference for surge protection of the connected components. A signal connection module includes circuitry for surge protection of the connected A/V components receiving electrical power from an adjacent wall socket. The protection circuits in the signal connection module provides an isolated ground reference for the A/V components sharing a common ground connection at the wall socket, or a power conditioning module connected thereto.

14 Claims, 7 Drawing Sheets

U.S. PATENT DOCUMENTS

| | | | |
|---|---|---|---|
| 4,918,565 A | 4/1990 | King | |
| 4,922,374 A | 5/1990 | Mueller et al. | |
| 4,937,722 A | 6/1990 | Deierlein | |
| 4,944,698 A | 7/1990 | Siemon et al. | |
| 4,968,264 A | 11/1990 | Ruehl et al. | |
| 4,996,945 A | 3/1991 | Dix | |
| 5,032,946 A | 7/1991 | Misencik et al. | |
| 5,089,929 A | 2/1992 | Hilland | |
| 5,130,881 A | 7/1992 | Hilland | |
| 5,153,806 A | 10/1992 | Corey | |
| 5,177,782 A | 1/1993 | Henderson et al. | |
| 5,216,569 A | 6/1993 | Brookhiser | |
| 5,224,013 A | 6/1993 | Pagliuca | |
| 5,278,720 A | 1/1994 | Bird | |
| 5,365,395 A | 11/1994 | Callaway | |
| 5,371,647 A * | 12/1994 | Fried et al. | 361/119 |
| 5,377,067 A | 12/1994 | Tanaka et al. | |
| 5,388,021 A | 2/1995 | Stahl | |
| 5,410,443 A | 4/1995 | Pelegris | |
| 5,412,526 A | 5/1995 | Kapp et al. | |
| 5,423,697 A | 6/1995 | MacGregor | |
| 5,483,409 A | 1/1996 | Heidorn et al. | |
| 5,488,535 A | 1/1996 | Masghati et al. | |
| 5,537,044 A | 7/1996 | Stahl | |
| 5,543,999 A | 8/1996 | Riley | |
| 5,555,153 A | 9/1996 | Frederiksen et al. | |
| 5,566,056 A * | 10/1996 | Chaudhry | 361/117 |
| 5,617,288 A | 4/1997 | Zaretsky | |
| 5,691,872 A | 11/1997 | Cohen | |
| 5,734,542 A | 3/1998 | Cohen | |
| 5,757,603 A | 5/1998 | Kapp et al. | |
| 5,768,081 A | 6/1998 | Cohen et al. | |
| 5,896,265 A | 4/1999 | Glaser et al. | |
| 5,914,662 A | 6/1999 | Burleigh | |
| 5,978,198 A | 11/1999 | Packard et al. | |
| 6,147,304 A | 11/2000 | Doherty | |
| 6,188,557 B1 | 2/2001 | Chaudhry | |
| 6,226,162 B1 | 5/2001 | Kladar et al. | |
| 6,226,166 B1 | 5/2001 | Gumley et al. | |
| 6,229,682 B1 | 5/2001 | Mechanic | |
| 6,252,754 B1 | 6/2001 | Chaudhry | |
| 6,282,075 B1 | 8/2001 | Chaudhry | |
| 6,385,030 B1 | 5/2002 | Beene | |
| 6,414,241 B1 | 7/2002 | O'Donnell | |
| 6,606,232 B1 | 8/2003 | Vo et al. | |
| 6,614,636 B1 | 9/2003 | Marsh | |
| 6,628,497 B1 * | 9/2003 | Napiorkowski et al. | 361/119 |
| 6,775,121 B1 * | 8/2004 | Chaudhry | 361/111 |
| 6,778,375 B1 | 8/2004 | Hoopes | |

* cited by examiner

PROTECTION CIRCUIT FOR SIGNAL AND POWER

BACKGROUND OF INVENTION

The current invention relations to a wall mounted electrical junction box for power and low voltage signal connections of related electronic components, circuits composed therein and methods of using the same.

Electronic components used in audiovisual systems are subject to damage from electrical power surges. Numerous technologies and designs exist for either disconnecting equipment from such damaging conditions, or shunting the power to a ground connection via a nonlinear component. However, effective implementation of the schemes and designs requires interconnected components to be connected with a single ground source.

Moreover, typical audiovisual systems utilize multiple powered components, which are interconnected to receive and transmit relatively low voltage signals. To the extent that some of these components are physically separated from other components, for example the visual display unit for home theater system might be located across the room from a cabinet containing the DVD player or high-definition television encoder, low voltage signal wire cabling is preferably routed through walls to avoid physical hazards, as well as a cluttered appearance.

Although power and signal cables might be physically separated outside of the interconnected components, over voltage conditions, arising from unstable line voltage, or lightning strikes, can propagate through multiple components in the absence of an appropriately designed system. Accordingly, there exists a need for connection devices that can facilitate the installation of multiple, physically separated audiovisual components in a manner that readily provides necessary surge protection.

Their exists a further need for connection devices that can be readily installed in walls and accommodate a wide variety of low voltage signal connectors as might be encountered when combining various types of displays, video processors, audio equipment, data communication equipment and/or computers.

There remains a further need for such a connection devices that permits various audiovisual components to be mounted nearly flush to the structural walls or other architectural features, yet at the same time accommodate a variety of connector plugs and socket styles.

SUMMARY OF INVENTION

The above and other objectives of the invention is satisfied in a first aspect by providing a connection box for wall installation that has a front face that covers substantially all of a cut-out in the wall. Within the front face is a first cavity extending inward to receive a power cord plug at a socket disposed at the bottom of the cavity, for example, a power plug connector having line (L), neutral (N) and ground (G) terminals. The corresponding socket has input terminal for L, N and G disposed behind the socket. The box also includes an aperture for receiving at least one of a blanking plate & a signal connection module, two or more walls disposed on opposing sides of the aperture and extending inward faces. The inwardly extending walls are in connect to form an electrical contact with at least one of the ground input or output terminal of the socket. Thus, power plugs can be recessed into the connection box, via the aperture, permitting a nearly flush mounting of the associated A/V components.

In a second aspect of the invention, a signal connection module or blanking plate is inserted into the aperture cover the remainder of the aperture, avoiding an opening between the wall interior and the room. The module or blanking plate is supported by the walls on opposing sides of the apertures.

The above and other objectives of the invention is satisfied in a first aspect by providing power to the electronic components of the Audio/Visual system power from a single power conditioning module, the power conditioning module having an input connection in which phase, neural and ground wires are connected to the power mains circuit. Physically adjacent A/V components, which may or may not include a display, are connected to the output terminals of the power conditioning module to receive filtered power there from.

Physically remote A/V components are connected to the power-conditioning module via a pair of connection boxes that accommodates a power receptacles and low voltage signal receptacle. The first connection box is located proximal to the power-conditioning module and A/V components. The second connection box is located proximal to the physically remote equipment. The display is energized via connection to the output receptacles of the remote connection receptacle and receives at least one of an audio or visual signal via connection to the signal output socket of the remote connection receptacle. Accordingly, the display and signal generator share a common conditioned power source from the power conditioning module, and the remote connection receptacle provides a common ground connection between the signal generator, the display unit and the power-conditioning module.

In another aspect of the invention, the signal connection module is dimensioned for insertion into the aperture within the front face of the aforementioned connection box. Accordingly, the signal connection module has a substantially flush front face with one or more sockets for receiving corresponding signal plugs from the associated A/V equipment. The signal module also has at least two adjacent sides connected to the front face of the module that fit closely between corresponding walls extending inward from the aperture in the connection box. Low voltage signal output connectors emerging rearward from behind the front face correspond to the multiple low voltage signals input sockets disposed on front face of the module. Two or more opposing sides of the module are in electrical connection with ground shield wires associated with the low voltage signal wires that connect the input and output connectors in the module, providing electrical continuity to a common ground associated with the power socket ground wire (via physical contact with the wall associated with the aperture in the connection box.) Electrical continuity is maintained over a range of alternative positions of the signal module within the connection box aperture, thus both the signal and power plugs can be recessed into the connection box, permitting a nearly flush mounting of the associated A/V component with respect to the walls of the room.

As will be further described, other aspects of the invention include mechanical features for grasping, moving and latching the signal module at variable position rearward from the front face of the connection box, as well as connection boxes configured to receive an array of signal connection modules, with or without blanking plates. Thus the inventive connection box and device accepts various low voltage signal modules for rapid installation and reconfiguration. Further the box and device creates an isolated ground reference for all signal modules, with a common surge protection circuit. In additional, the preferred embodiment of the signal protection circuit uses fewer, and lower cost components that the prior art devices.

The above and other objects, effects, features, and advantages of the present invention will become more apparent from the following description of the embodiments thereof taken in conjunction with the accompanying drawings.

BRIEF DESCRIPTION OF DRAWINGS

FIG. 3A is an elevation of the connection box taken through the wall bisecting the signal connection module; whereas

DETAILED DESCRIPTION

Figure 1:
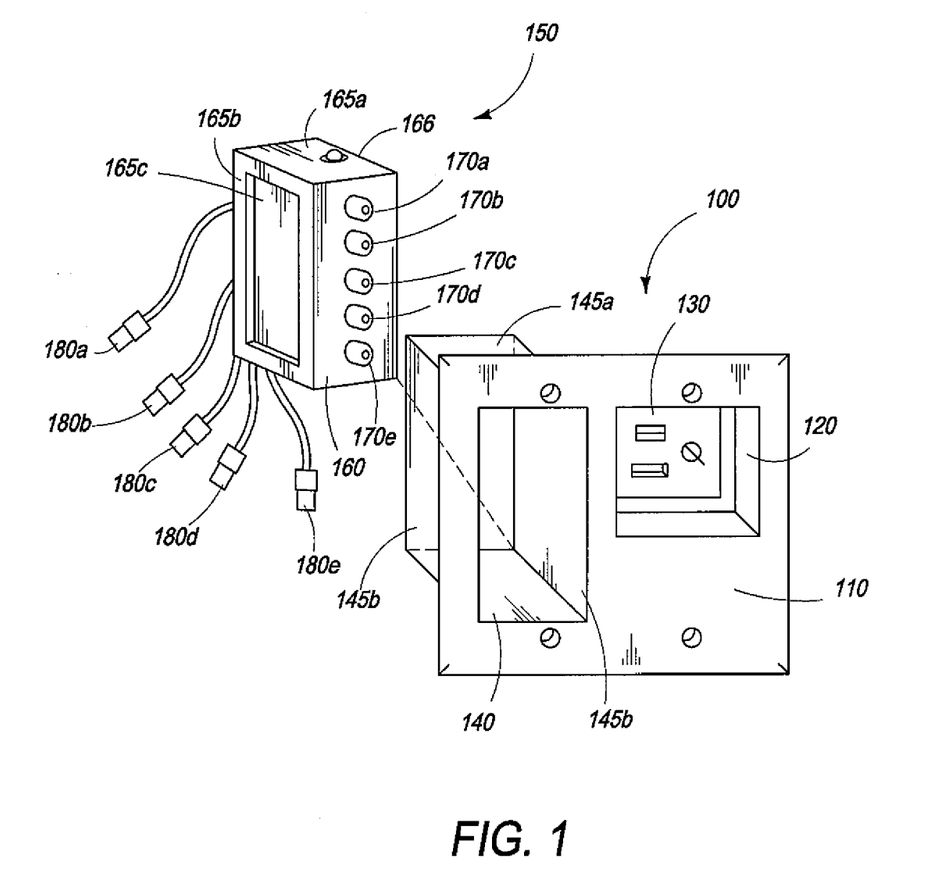
FIG. 1 is an exploded perspective view showing the connection box and signal connection module.

FIG. 1 illustrates in an exploded perspective view the connection box 100 and signal connection module 150 for use therewith. Connection box 100 has a front face 110 for mounting substantially flush with a surface, generally a room interior wall. Although signal connection module 150 is normally inserted into the connection box from the front face 110 side of connection box, it is shown behind the front face for illustration purposes. Connection box 100 has a first cavity 120 that extends inward, that is toward the interior of the wall, from the front face 110 for receiving a power connector in socket 130 disposed at the bottom of the cavity 130. Accordingly, socket 120 has electrically isolated input sockets for receiving plug prongs for connecting the corresponding line, neutral and ground wires thereto. Although not shown in this Figure, it should be understood that connection box 100 also includes corresponding line, neutral and ground connection terminals for receiving bare conductor wire mounted behind the socket 120. The aforementioned components are however illustrated in the schematic electrical circuit diagram of FIG. 2. The front face 110 of connection box 100 also includes at least one aperture 140 for receiving either a blanking plate 105 (shown in FIG. 4) or a signal connection module 150. Signal connection module 150 is inserted into aperture 140 and thus supported by two or more sidewalls, 145a and 145a' that are disposed on opposing sides of the aperture 140 to extend inward from the front face 110. In this embodiment, two additional side walls 145b and 145b' connect with walls 145a and 145a' to form a box like enclosure. Further details of the construction and operation of the signal module 150 are described below and in particular with reference to FIGS. 2, 3 and 4.

It should be appreciated that power socket 120 is optionally selected to receive either straight prong connector plug, as illustrated, or a twist lock plug, but can be any plug type, particularly when it is desired to limit the connection to a single electronic component with a mating power cord connector, such as a power conditioning module. Connection box 100 also has a plurality of holes at the periphery of face 120 that are disposed to align with convention terminal box, or j-Box, located behind the wall, the terminal box being generally required by electrical and building codes. Thus, screws inserted in these holes physically secure connection box 100 with respect to the wall or other planar mounting surface. In the most preferred embodiment, connection box 100 extends like a flange about the periphery of the front face 120. Such a flange extension conceals the box, but is more preferably limited in outer dimensions for receiving a decorative cover plate. Thus, outer or peripheral dimensions of front face 110 are slightly small than a conventional decorative wall plate, should a user or consumer wish to cover a portion of face 120 for aesthetic reasons.

As will be further described with reference to FIGS. 2, 3 and 4, at least one of the sidewalls 145a/145a' and 145b/145b' of connection box 100 contact and provide electrical continuity to the ground input and output terminals or junctions of signal connection module 150.

Signal connection module 150 has a front face 160 and at least two opposing sides 165a and 165a' parallel to each other and disposed perpendicular to the front face 160. Multiple low voltage signal input sockets 170a, b, c, d and e are also disposed on front face 160. Corresponding multiple low voltage signal output connectors 180a, b, c, d and e emerge rearward from behind the front face 160 having separate parallel electrical connections corresponding to input sockets 170a-e. Further, in this preferred embodiments shown, output connectors 180a-e are separated from the rearward portion of signal connection module 150 by a lengths of signal wire cable 181a to 181e. The signal wire cable extends output connectors 180a-e away from signal connection module 150 to enable the convenient installation of signal wire from the room after connection box 100 is installed. That is, signal connection module 150 can be inserted from the room side of connection box 150. Accordingly, it should be appreciated that the signal connection module are readily reconfigured after an initial installation, should the user or consumer wish to deploy alternative A/V sources. The signal cables 181a to 181e provide slack, and hence effective strain release, for cable running behind the wall when the signal connection module is installed or reconfigured. Further, the signal wire cable 181a to 181e enable the use of larger output sockets than might not fit on the front face 160 of signal connection module 150, but would still fit in the space behind or within the wall.

Figure 2:
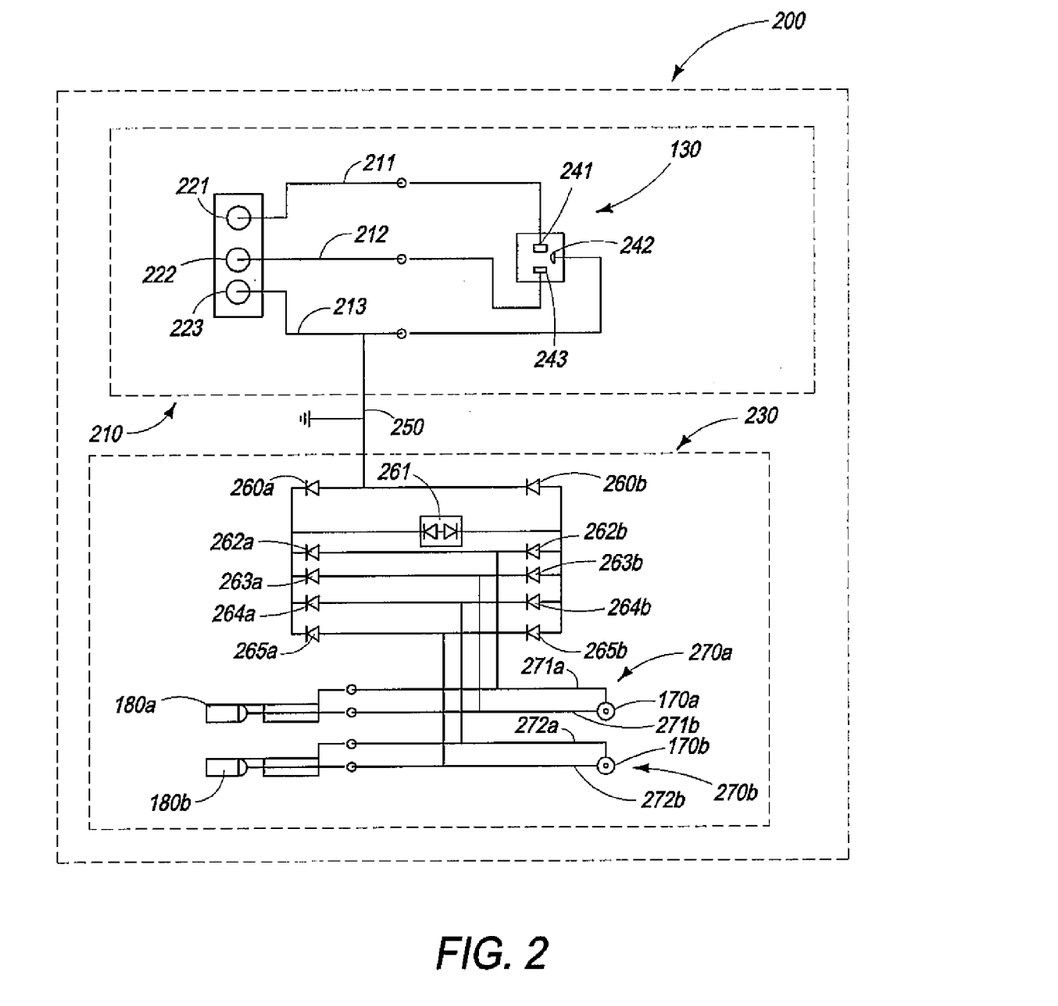
FIG. 2 is a first schematic electric circuit for the connection box and signal connection module.
Figure 3A:
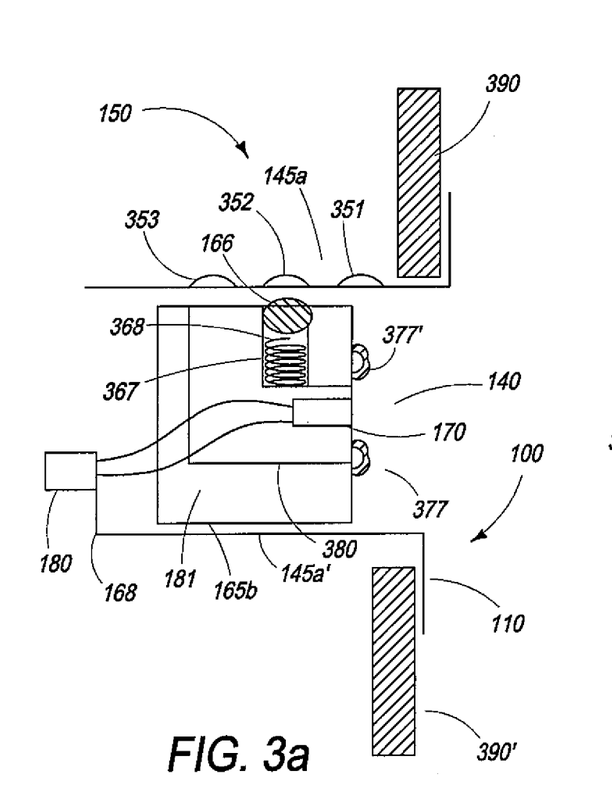
Figure 3B:
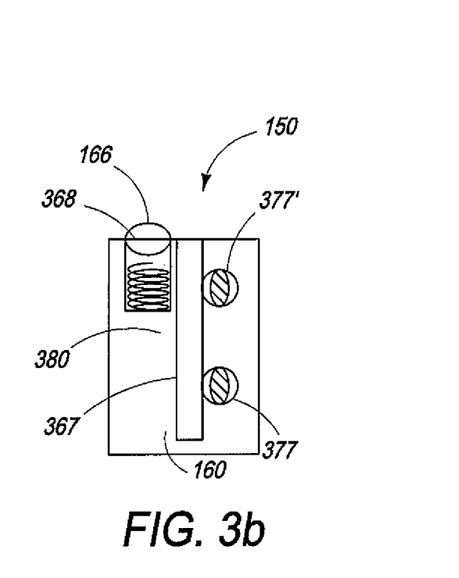
FIG. 3B is an exterior elevation as observed from the room.

Further, as is more fully described with respect to FIG. 3, additional mating components associated with the sides of signal connection module 150 and connection box 100 permit signal connection module 150 to be offset at multiple positions within aperture 140. Such features include a spring-loaded ball 166, which is mounted within signal connection module 150 and extends partially through a hole in the upper surface 165a of connection module 150. As the associated spring urges ball 166 into the hole and a corresponding orifice on the opposing face of the aperture wall 145a, the signal connection module 150 is secured in aperture 140, but still readily removable by the application of sufficient lateral force to overcome the retaining force of the associated spring. Accordingly, on moving the signal connection module laterally within aperture 140, ball 166 is displaced back into the signal module, out of contact with the opposing face of the aperture wall. Thus, the placement of multiple mating orifices on the opposing face permits the variable adjustment of the recess of the front face 160 of signal module 150 behind the face 110 of connection box 100, as shown in FIG. 3 and FIG. 4, below. Referring to the schematic electrical circuit of FIG. 2, it should be apparent that the two opposing sides 160 of signal connection module 150 make electrical contact connection with ground shield wires associated with 2 or more of the signal input and output junction 170/180, which can be plugs or sockets. Thus, at least one of the sidewalls 165a/a' or 165b/b' makes electrical contact with one of walls 145a/a' or 145b/b' associated with the aperture in connection box 100, thereby providing a common ground connection between the circuit sub modules in the Figure. However, it should be further appreciated that the electrical continuity between the respective ground wires in the signal module and the connection box is insured by the springs urging of ball 166 into contact with both the signal module and the connection box components.

In a more preferred embodiment, at least one of the sides 165b of signal connection module 150 has a recessed flat panel, 165c, for receiving a label displaying printed matter, such as product identification, installation instructions and the like. Placing the printed labels within recessed panel 165c avoids the wear or degradation of the label on the otherwise contacting face of the sides walls 145b of aperture 140 in connection box 100.

The front face 160 of signal connection module 150 optionally includes any variety and combination input sockets and output sockets or output plugs, such as RCA, VGA, Co-axial cable, phone, data communications, Ethernet type, and the like. It should be further appreciated that extension cable 181a-e can be of any length, or alternatively eliminated depending on the need for the optional adjustability of signal connection module 150 within aperture 140, the skill of the installer, or the intended permanence of the installation.

The electrical schematics of circuit 200 in FIG. 2 further illustrates other aspects of the invention wherein optional signal protection, power protection (collectively SP) or power conditioning components are interconnected via a common ground connection between the signal over-voltage protection circuit module 230 and the ground wire of socket 130 of the power circuit module 210. It should be appreciated that the actual circuit protective function in power circuit module 210 and signal over-voltage protection circuit module 230 is accomplished by limiting voltage differences between wires passing to the protected A/V equipment (PE) to levels safe for the equipment. If the allowable voltage difference between two terminals of the equipment is exceeded, either an insulating path isolating the connections will flash over, or a component connecting the two terminals will overheat and be damaged. Since both the number of terminal connections and the allowable voltage differences vary widely from one piece of equipment to another, surge protectors must be specially designed to meet the needs of the PE. Broadly, the connection to PE can be defined as being either "Power" (e.g., 120 VAC in many cases), or "signal" connections. Power connections provide for the power supplies for the PE, as well as powering AC-powered equipment such as monitors and display, as well as DVD players, amplifiers and the like. Signal connections are generally of lower voltage and current than power connections, and are used to transmit information and control among different pieces of the PE. Typically, but not always, the AC connections will withstand larger voltages than the signal connections.

Four components that are relatively uncommon are found in surge and overvoltage protection circuits. Four of the components are non-linear voltage dependent devices, and include Gas Tubes (GT), diodes (D), sidactors (Q), bi-directional transorbs, (T) and metal oxide varistors (MOV). These components are normally insulating in the normal state of the devices operation, but become highly conductive in response to a voltage surge. Accordingly, they are connected in parallel to protect circuits from over voltage by providing an alternative path for current flow. Gas Tubes (GT) are spark-gap breakdown devices, which typically have voltage breakdown levels of 90-1000V. Below the breakdown level, they are totally non-conducting. Once they are broken down, the voltage across them falls to ~30V even for very large currents. They are very inexpensive and have high surge absorbing capacity. Even small tubes (circa 8 mm diameter×6 mm long) can conduct short (20 microsecond) current impulses up to 10,000 A.

It should be appreciated that the exemplary protection circuit shown in FIG. 2 is not intended as limiting examples, as in alternative embodiments further surge protection circuitry is optionally provided on an adjacent PCB behind the power socket 130, being operative to shunt current from high voltage transients in the power lines to the common ground connection. In other selected embodiments, a noise filtering circuit is optionally provided on an adjacent PCB behind the power socket 130.

The "Q" components are sidactors, a silicon solid-state analog of the gas tube. Sidactors are non-conductive until a breakdown voltage (typically 30V-1000V) is reached, and then they become highly conductive, with a typical saturation voltage of 3-5V while conducting. Q components, being latching devices, after "tripping" require a voltage reduction below a specific threshold before they unclamp, and become resistive again. The Q devices used in embodiments described in FIGS. 2, 5 and 6 have a 5-15 volt breakdown level. Accordingly, these exemplary circuits accommodate a wide range of low voltage switching modules not likely to have a separate ground. Both the GT and the Q devices are difficult to use in power circuits, because once they have broken down, they form effectively a dead short across the terminals, and take the entire available current of the supply, until (if the circuit is AC) the applied voltage goes through 0, and they turn off. That is a major reason that AC protectors generally use varistors.

Additional surge protection components include zener diodes (D) and the closely related transorbs are widely used in SP circuits.

The MOV components (metal-oxide varistors) are ceramic semiconductor devices widely used for AC power protection. They typically have limiting voltages from 30V to 1000V. MOVs are not breakdown devices, but voltage limiters similar to zener diodes or transorbs. They start to conduct above a certain voltage. The MOV devices used here in the AC or power circuit preferably limit the incoming voltages to about at 430V.

Figure 5:
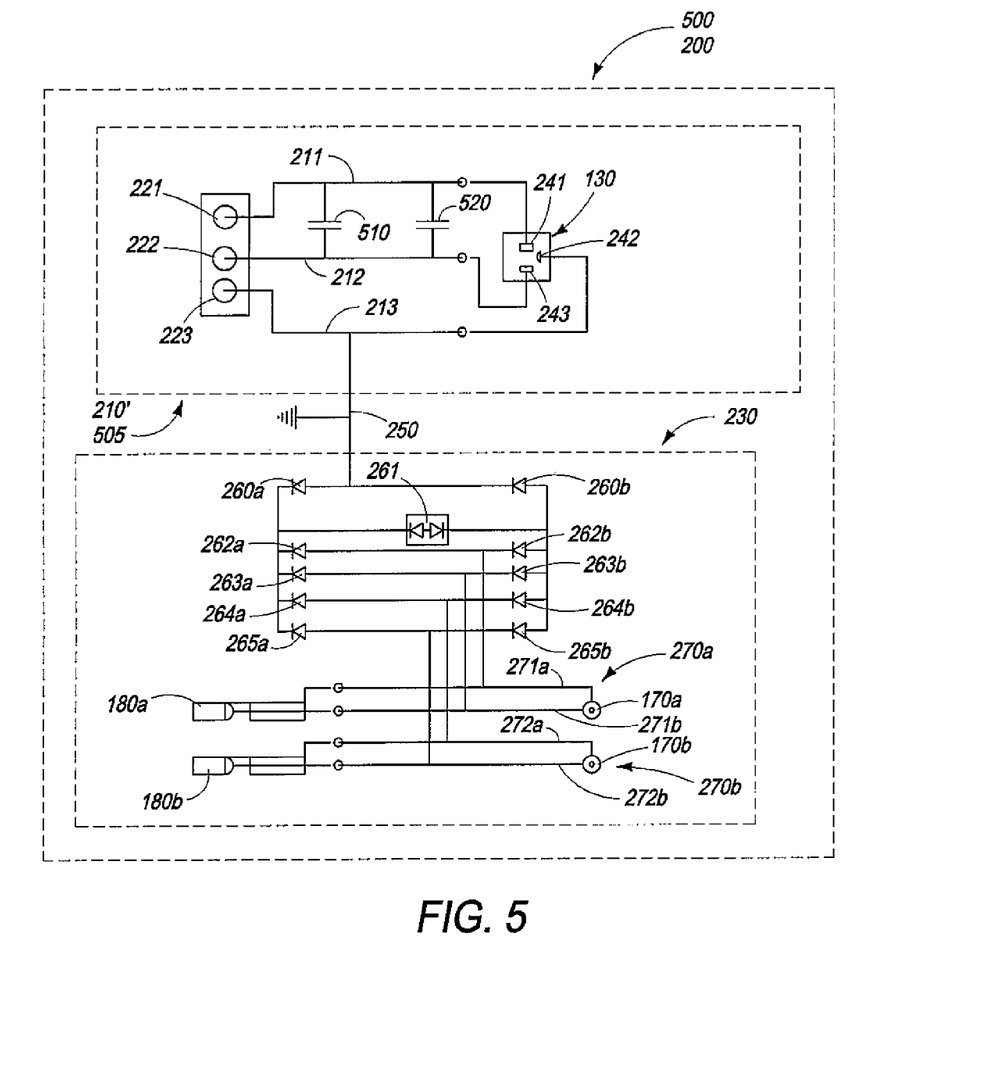
FIG. 5 is a second schematic electric circuit for the connection box and signal connection module.
Figure 6:
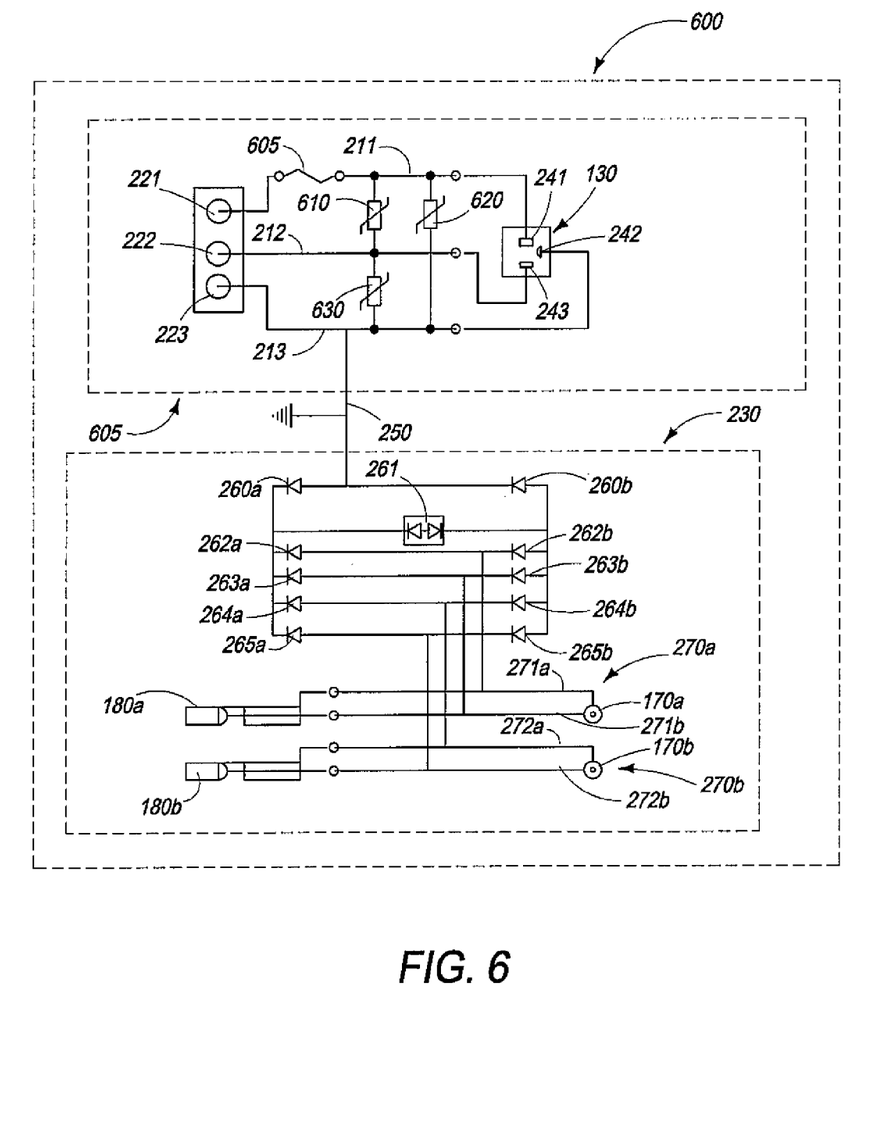
FIG. 6 is a third schematic electric circuit for the connection box and signal connection module.

Additional components, shown in the circuit diagrams in FIGS. 5 and 6, that perform auxiliary functions include thermal fuses (TC) and fuse traces (FT) to protect against sustained and impulse AC overvoltage. The GTs themselves are not inherently necessary in the operation of these circuits under most conditions, but provide extra protection in the case of very high-current surges (e.g., >500 A) that might occur under direct lightning strike conditions. An example of such an event would be if lightning struck directly an antenna or satellite signal receiving dish. For components inside a building, the GTs would not normally be used; they are described for completeness only. Each thermal cutoff fuse is placed as near as possible a metal oxide varistor such that in a sustained high voltage conditions, if the overvoltage heats and then permanently damages the metal oxide varistor, the associated thermal cutoff fuse is activated to open the circuit leading to both the MOV and the protected equipment, thus disconnecting the excess voltage.

It is also desirable to include one or more sub circuits that indicate if the protector receives power from the wall, or has been damaged or tripped, and is thus not operative even if receiving AC power from a wall socket. Those of ordinary skill in the art can appreciate that a light emitting diode, LED, will function as such an indicator when disposed between the line and neutral and circuit in series with the appropriate resistor and diode to indicate to the user that the wall socket connection is powered. It will be further appreciated by one of ordinary skill in the art that signal protection sub circuit modules may also include additional circuit components that comprise the light emitting diode to indicate when the output socket is no longer powered, such as when one or more of the thermal cutoff fuse has tripped.

The "P" component, or the fifth type of component, is not voltage sensitive per se, like the other components, but has a positive-temperature-coefficient resistance (PTCR), and acts as a resistor (typically a few ohms) at low temperatures. The preferred PTCR component is particularly non-linear in resistance at a specific temperature threshold, reached by joule heating from carrying current, with the resistance increasing by as much as 1 million times, effectively opening the circuit, to protect the PE.

Thus, in FIG. 2, the separate socket terminal on the face power plug sockets 130, denoted as line voltage (L) 241, Ground (G) 242 and neutral (N) 243, are connected by wire 211, 222 and 223 to respective rear connection terminals 221, 222, and 223. The rear connection terminals are for securing conventional interior power wiring, per local electrical and building codes. Ground wire 213 is represented as connected to a common ground to emphasize the electrical continuity between the signal connection module and connection box, shown as circuit trace 250.

Each pair of input connectors shown in this diagram, 270a and 270b, comprises an outer conductor, usually signal ground, which flows to respective output terminal 180a and 180b over signal wires 271a and 272a. Central socket conducts of sockets 170 and 170b connect to the center pin of output thermals 180a and 180b via signal wires 271b and 272b.

The signal connection module 150 preferably has an over-voltage protection circuit 230, which is disposed in serial connection between each of the signal paths 270a through e connecting the isolated input and output (I/O) terminals or junctions 170/180a-b. Note that additional I/O terminals, such as those described with respect to FIG. 1, are omitted merely to simplify the diagram, the number and type in each Figure being exemplary and not intended to limit the scope of the invention.

Signal wire lines 271a/b and 272a/b are in fact preferably formed on a printed circuit board (PCB) to facilitate interconnection with the protection circuitry. Thus, each individual signal wire in the over-voltage protection circuit 230 is in a parallel connection with a protected path to ground trace 250 via a first pair of isolating diodes. Signal wire 272b is isolated from both a unidirectional voltage limiting device 261 and rectifier diode 260b, which lead to ground, by diode pair 265a and 265b. Signal wire 272b connects to cathode diode 265b, which then connects via the anode to the cathode of unidirectional voltage limiting device 261. The anode of diode 265b also connects to the anode of rectifier diode 260b, limiting current flow to the clockwise direction in the loop connecting diodes 26a, 260b and unidirectional voltage limiting device 261. Signal wire 272b also has a parallel connection to the anode of diode 265a, the cathode of which connects to the anode of unidirectional voltage limiting device 261 as well to the anode of rectifier diode 260a. Signal wire 272b is similarly isolated from unidirectional voltage limiting device 261, rectifier diode 260a and rectifier diode 260b by diode pair 264a and 264b, and likewise for signal wire 271b (via diode pair 263a/b) and signal wire 271a (via diode pair 262a/b.) Thus, the diode pairs limit any excess current from the signal wires to flow clockwise to device 261, which acts in the reverse bias condition to set the protecting or clamp voltage for the protected A/V equipment. Thus, in this preferred embodiment rectifier diodes 260a and 260b direct current that is shunted from the signal lines upon an over voltage conditions, as defined by the voltage threshold of the device 261, such that the shunted current will flow in the clockwise direction to trace 250 and then to ground. Unidirectional voltage limiting device 262 is preferably a silicon avalanche diode (SAD) 261 that also isolates the signal circuit conductive traces 270a and 270b from high currents that could otherwise be conducted through rectifier diode 260a, such as upon high voltages surges occurring within power circuit module 210.

FIG. 3 illustrates further the mechanical features of a preferred embodiment of the invention, shown in elevation taken through an installed signal connection module taken orthogonal to the wall (represented by segments 390 and 390' above and below the signal connection box respectively.) Connection box aperture walls 145a have indentation(s) for receiving a mating feature disposed on the sidewalls of the signal module. Note that in this embodiment, signal connection module 150, while slideable within aperture 140, is disposed at the intermediate of three positions, being removeably secured by the displacement of ball 166 into the second of three hemispherical depressions that extend upward into wall 145a of aperture 140. Thus, the placement of the hemispherical depressions defines a plurality of latched positions for signal module 150 within aperture 140. A spring 5367 is fixed at one end to a portion of connection module 150 with the opposing end extending upward to urge ball 166 out of a circular hole formed in the upper surface 165a of signal connection module 150. Accordingly, on pulling or pushing module 150 in the lateral direction the force of spring 167 is overcome such that ball 166 can then engage in either of the adjacent hemispheres, 5353 and 5351, securing the signal connection module in an alternative position. As ball 166 is spring loaded, it provides for a secure electrical connection from connection box 100 to signal module 150. The spring is preferably supported within the bore of a threaded shaft 5367, the shaft bottom being either closed, or having a diameter small than the diameter of spring 368. The threaded shaft 367 is then inserted into a nut or other component with mating thread on the inside of wall 165a below the hole that limits the spring-loaded ball from extending there through. It should be appreciated that alternative embodiments to a latching function supplied by the spring-loaded ball include other types of spring members, possibly without a ball, but direct spring contact. Further embodiments that perform substantially the same function include, without limitation, plural mating feature on each signal connection module, such as holes or hemispherical depressions, with a spring-loaded ball or hemisphere extending from the aperture sidewall. In this alternative embodiment, the ball or hemisphere would retracts into the aperture walls of the signal connection module (or blanking plate) on translating the same within aperture 140 of connection box 100.

Further, the ball 5366 and mating features in aperture wall 145*a* or 145*b* are preferably offset to one side of the center line of signal connection module 150 to provide maximum space for signal connection sockets centered on the front face 160 of signal connection module 150, thus maximizing the available space for a PC board 380 and associated surge protection components.

FIG. 3 also illustrates one embodiment of a mechanical feature suitable for grasping and either sliding or removing the signal connection module 150 from the room side. A grip-receiving member 377 is preferably formed by providing an adjacent pair of slits to define a narrow strip of metal. The narrow strip of metal is then deformed outward from face 160 to form grip-receiving member 377, essentially an isthmus that extends several millimeters outward to the room side. Accordingly, a gripping tool can be inserted at the slit edges to reach behind and grasp member 377 from the room side of the connection box. It should be appreciated that grip receiving member 377 is alternatively formed as an inward protruding indentation formed about slits in the front face. In the latter embodiment, the gap between the slits when punched in forms an isthmus to provide access to insert an alternative tool behind the back of the front face to grasp the signal connection module 150. In either case, a preferred form of tool is essentially a plier with suitable dimensioned tips to grasp one or more of grip receiving member 377 and retract the signal connection module 150 back into the room. Further, a pair of grip receiving members 377 and 377' are preferably disposed offset from the centerline of signal connection module such that they do not interfere with the placement of signal sockets on the front face, or a printed circuit board (PCB) 5380 mounted within the signal connection module. Further, the connection box 150 preferably includes one or more backstops 168 that extend laterally at the rearward end of apertures walls 145*a* or 145*b* and thus preclude signal connection module 150 from accidentally being pushed through aperture 140 and falling behind the wall 5377.

In addition, the sequence of hemispherical depressions akin to 351, 352 and 353 are preferably disposed at equal offset from the vertical center line through aperture 140, on the bottom wall 165*b*, but omitted for clarity, for removable engagement of an additional spring loaded ball (also omitted for clarity) disposed at the bottom surface 165*a*' of signal connection module 150.

Figure 4:
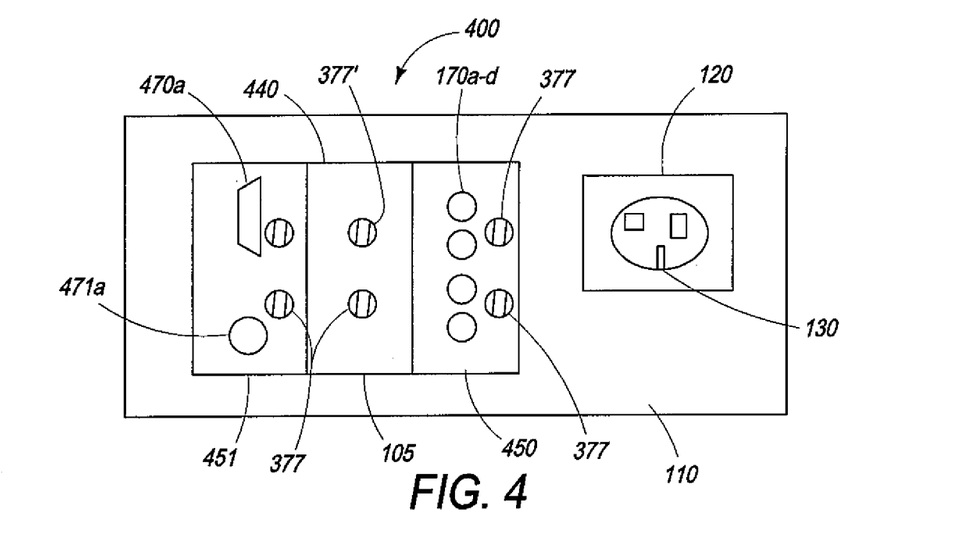
FIG. 4 is an elevation of an alternative embodiment of the connection box including an installed signal module as observed from the room.

FIG. 4 further illustrates the mechanical features of an alternative embodiments of the invention. Multiple signal modules and blanking plates are illustrated in an elevation of connection box 6400 as viewed from the room side. Thus, connection box 6400 has a wider aperture 6440 than aperture 140 in FIG. 1, to accommodate three signal connection modules. In this Figure, signal connection module 6450 and 6451 are disposed on opposing sides of blanking plate 440. Each of the signal module and the blanking place has one or more of substantially identical grip member 5377*a*, *b* or *c* disposed on their front face. Further, each of signal connection modules 6451 and 6450 deploy distinctly different types and combinations of low voltage signal sockets. That is signal connection module 6451 includes a substantially rectangular multi-pin connector terminal 6470*a* and a round connector terminal 6471*a*'. It should be appreciated that a multi-pin connector optionally replaces any round connector illustrated, which is round or substantially rectangular. Further, any of the output terminals on the rear side of the signal connection module 150, such as 180*a-e* in FIG. 1, are optionally configured as male or female connections, screw or spring loaded terminals for receiving bare conductor or insulation displacement style terminals, and the like.

Also illustrated in further detail in FIG. 4, a blanking plate 105 has the same exterior dimensions as signal connection module 150, with a substantially planar front face, and a ball 166', or other latching member, extending from face 165*a*' to provide the same adjustable function as ball 166 on signal connection module 150. Blanking plate 105 need not include additional side faces, provided that face 165*b*, and a corresponding face at the bottom of blanking plate 105, or other mechanical features, provide sufficient structural rigidity. Similarly, in the signal connection module 150 side faces 165*b* and opposing side face 165*b*' (not shown) are also optional, being provided to house and protect electrical component and terminal within signal connection module 150.

FIG. 5 illustrates another embodiment of a circuit 500 within a signal connection box in which the power circuit module 505 includes further electronic components to filter the AC power before it reaches the A/V device. Thus, the circuit in FIG. 5 removes AC ripples and other noise induced or picked up by a cable segment connected to a power-conditioning module as described below with respect to FIG. 7. Within power circuit module 505 a pair of 0.47 microfarad capacitors 510 and 520 are disposed in parallel between the line 211 and neutral 212 wires. The circuit 500 utilizes the same over-voltage protection circuit 230 as previously described with respect to FIG. 2. The components in power circuit module 505 are preferably supplied on a printed circuit board.

FIG. 6 illustrates another embodiment for deployment within a connection box or receptacle, in which circuit 600 now includes a power circuit module 605 configured with power line surge protection providing a parallel connect to ground, in the occurrence of a power surge, for the L, N and G lines of the power socket. A first MOV 610 is interposed between line (L) 211 wire and the neutral (N) 212 wire, a second MOV 620 is interposed between line (L) 211 wire and ground (G) 213 wire, with the third MOV 630 being interposed between the N 212 wire and the G 213 wire forming a delta circuit among L, N and G. For AC or peak voltages below 430V, the MOVs are almost completely nonconductive. However, when the voltage across the input connections goes above a threshold, preferably about 430V, the MOVs conduct, thus generally limiting the voltage at the rear connection terminals 221, 222, and 223, to what is commonly described as a clamp voltage. The clamp voltage experienced by the protected equipment depends on the resistive characteristics of the MOV at the surge voltage above the threshold, and the MOV capacity for handling power without breakdown. IEEE descriptions (IEEE Standard C62.41-1991, at p. 31) of the "surge environment" indicate that voltage surges as large as 6 kV, with corresponding current surges up to 3,000 A, could be produced L-N or L-G, at a residential receptacle, by nearby lightning. From manufacturer's characteristics for the MOVs used, the protector should limit the 6 kV impulse to 800-900V. There is data, published in Power Quality, K. B. Bowes, 1990, pp 296-310, suggesting that AC appliances are robust against short impulses, applied to the AC terminals, of up to 1000V. So the AC surge protection is provided by the L-N and L-G MOVs. The N-G MOV is not normally active in this situation, but might be important, if, for example, the receptacle that provided the power were L-N reverse-wired. A thermal fuse 606 in line wire 211 provides protection to the multiple MOV's in circuit 600 from a sustained high voltage condition.

Figure 7:
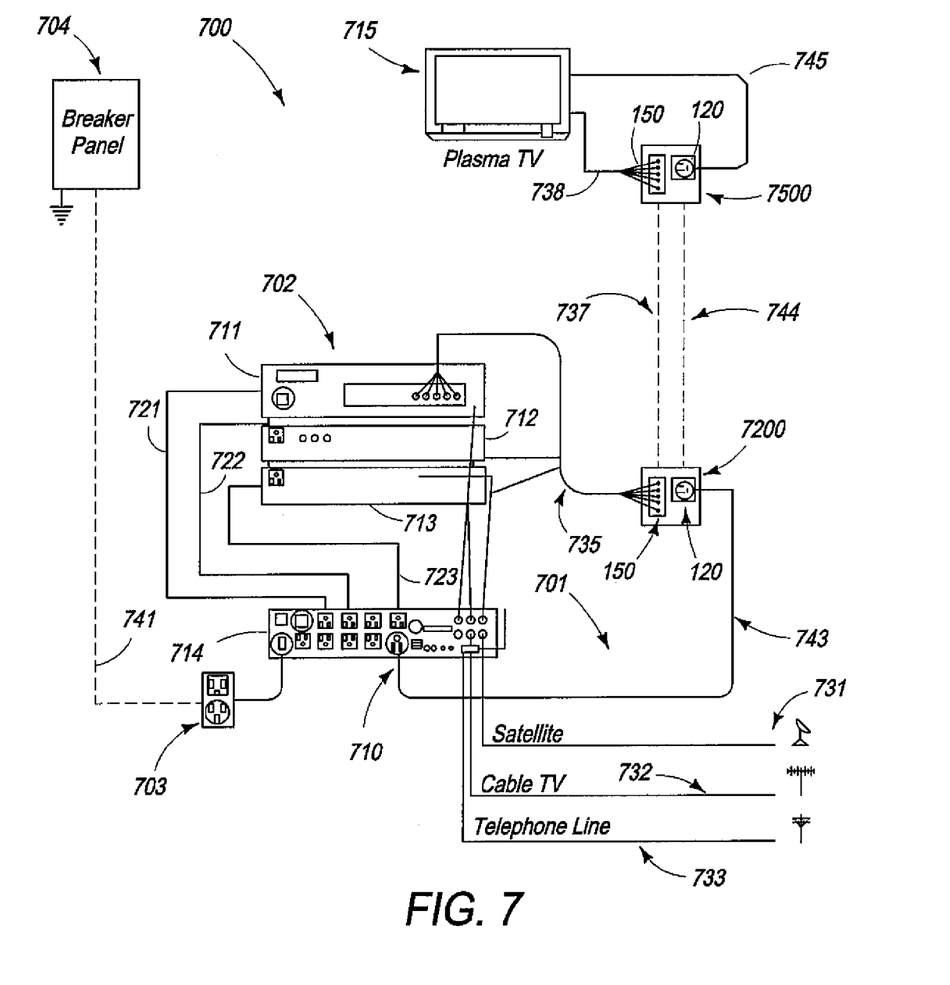
FIG. 7 is a schematic electrical circuit for the interconnection of A/V equipment to a common power conditioning module as the power supply, utilizing a connection box, having the circuit of FIG. 2, adjacent to the power conditioning module

FIG. 7 is a schematic electrical circuit 700 for the interconnection of A/V equipment to a common power-conditioning module 714 as the power supply. The A/V components 702 optionally generate signals from media, or receive them externally, for example from a telephone transmission line via a modem or DSL signal via wire or cable 733, cable TV via wire or cable 732, or via a satellite receiver on wire or cable 731. The connection box 7200 adjacent to power-conditioning module 714 and signal generating A/V components 702 preferably has the mechanical features disclosed in FIGS. 1, 3 and 4 and the circuit of FIG. 2. However, the second connection box 7500 differs in that it utilizes the circuitry described in FIG. 5. Signal generating A/V equipment 702 optionally includes one or more of the video processor 711, DVD player 712 and stereo receiver 713. The A/V components receive power via cables 721, 722 and 723 respectively, all of which are connected to the output sockets on the back of power conditioning module 714 to receive filtered power, that is free from AC ripple and other noise signals that can ultimately affect the signal quality. It should be noted in the preferred embodiment all of the components receive filter power from a common power conditioning modules 714, which is in turn connected to a wall outlet 703 via cord 742, and thus wired to the main breaker panel 704 via cable 741.

A/V system 700 includes a display, such as a wall mounted plasma television or monitor 790 disposed remotely from the signal generating A/V equipment 702. As a plasma display television is typically wall mounted rather remote from the other components and the power conditioning module, it receives power via the remote connection box 7500 via cord 745. Connection box 7500 and 7200 have their respective power plugs connected by cable 744, which is behind the wall. According the external plug 120 of connection box 7200 is connected to the common power-conditioning module by cable 743, at plug 710 on the back of the signal-conditioning module.

As previously described with respect to FIG. 5, connection box 7500 preferably includes a filter circuit module disposed in serial connection between the input and output terminals of the L and N wires of the power socket portion of the connection box. Thus, any noise picked up by the power cable connection between connection box 7200 and connection box 7500 is suppressed by the capacitive filters.

As power conditioning module typically includes internal overvoltage and surge protection circuit modules, all the A/V components connected thereto are protected from power surges from either breaker panel 704 or electrical distribution cable 741 that supplies wall socket 703. The common circuit protection components in the power-conditioning module 742, thus provide a common ground reference at the same wall socket 703.

The signal wires from the various A/V signal-generating components 702 plug into connection box 7200 at signal connection module 150. Optionally, a single cable bundle 737 connects connection box 7200 with connection box 7500 such that the display 714, and/or associated output speakers can be wired to nearby connection box 7500 via signal connection module 150'. As both connection boxes 7200 and 7500 deploy the surge and voltage transient protection circuit of FIG. 2, the signal and power circuitry of the all the interconnected A/V components share a common ground, offering more reliable protection from voltage and current transients of any origin.

Thus, all of the display 714, signal generating A/V components 702 and power conditioning module 742 have a common ground connection with multiple layers of surge protection appropriate to low voltage signal lines, as well as AC powered circuitry.

Figure 8:
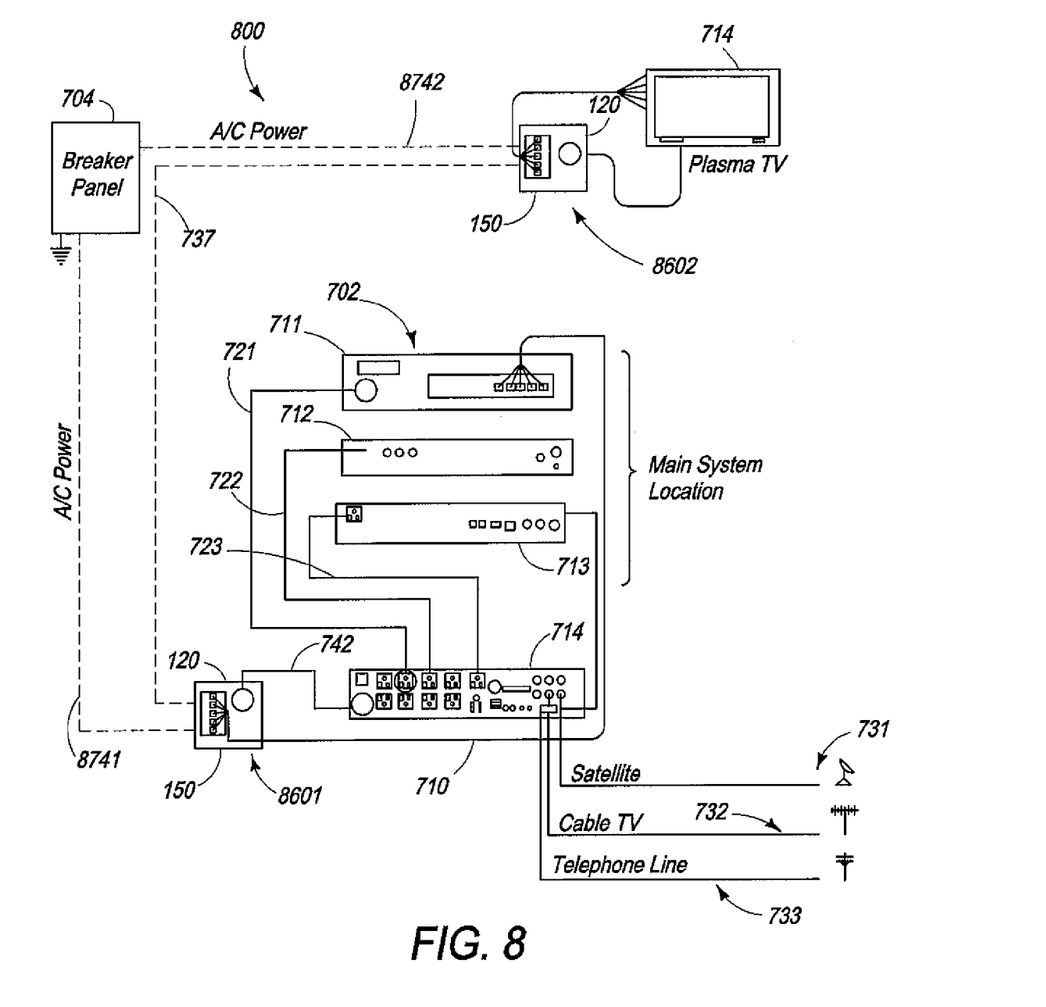
FIG. 8 is a schematic electrical circuit for the interconnection of A/V equipment wherein only the signal processing module(s) are connected to the power-conditioning module, and the display unit is independently connected to the breaker panel as the power source.

It should be appreciated that the various configurations of connection boxes and alternative embodiments of internal circuitry are also advantageously deployed when the various A/V components do not receive power from a single power-conditioning module. FIG. 8 is a schematic electrical circuit for the interconnection of A/V equipment wherein only the signal generating module(s) are connected to the power conditioning module 714, display unit 715 being independently connected to the breaker panel as a power source. That is, the remote display 715 while similarly connected to connection box 8602 for signals, now receives power directly from a breaker panel 704 via AC power cable 8742, which connects to the rear of the power socket module 120' in connection box 8602. A connection box 8601 is deployed at the signal generation and power-conditioning module location and connects to the second connection box 8602, deployed at the display device.

For both connection box 8601 and 8602, the housing configuration preferably corresponds to the teachings of FIGS. 1, 3 and 4. As Display 715 does not enjoy the overvoltage and surge protection from power conditioning module 714, connection box 8602 deploys the internal circuitry of FIG. 6, offering protection from transient and sustained overvoltage conditions arising from AC power cable 8742, or the breaker panel 704. Thus, a further embodiment of the invention is the alternative circuit 800 for interconnecting A/V components 702 with a power-conditioning module 714 as previously described with respect to FIG. 7. Further, it should be appreciated that connection box 8602 provides a common ground reference between the signal wire and the power connections, while the display 715 has a common ground reference to the other A/V components, although not directly connected to power conditioning module 714.

In the embodiments embraced by FIGS. 7 and 8, it should be further appreciated that the connection boxes are preferably wall mounted in close proximity to the A/V components, thus avoiding the cluttered appearance and hazards of multiple wiring cables exposed within the room.

It should be noted that in the more preferred embodiment's connection box 8601 (or 7200 in FIG. 7) deploy a twist lock socket 120 for more secure connection to the power-conditioning module 714.

It should be appreciated that the signal generating components 702 include any combination of one or more of CD player, a DVD player, satellite receiver, HD TV signal generator, stereo receiver, audio amplifier, signal generator, cable TV box and the like. Although the protection circuits of FIGS. 2, 5 and 6 are preferably deployed within signal connection boxes having the mechanical features of FIGS. 1, 3 and 4, they may be deployed in other connection boxes housing power and signal wire connectors. Further, it should be appreciated that the A/V device connection circuits of FIGS. 7 and 8 need not be limited to deploy only the preferred embodiments of the connection box and circuits therewith, but are also applicable to alternative connection boxes and surge or filter circuitry within the connection boxes, as might be varied to accommodate alternative types of A/V equipment.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A circuit for interconnecting low voltage signals and providing over voltage protection, the circuit comprising,
   a) a plurality of input ports for receiving low voltage signals,
   b) a plurality of output ports for transmitting the low voltage signals received at the input ports,
   c) each of said input ports being connected to a corresponding output port by a separate parallel array of signal conductive paths, each parallel array of signal conductive paths comprising a signal ground path connected to a common ground
   d) a common uni-direetional voltage limiting device,
   e) a first ground rectifying diode having an anode connection to the cathode of said common uni-directional voltage limiting device, and a cathode connected to the common ground,
   f) a second ground rectifying diode having a cathode connection to the anode of said common unidirectional voltage limiting device, and an anode connected to the common ground,
   g) a plurality of first and second diode pairs, wherein each first and second diode pair is associated with one of the signal conductive paths between said input and output ports,
   h) wherein each of the signal conductive paths between said input and output ports is coupled by a conductive path to a junction with the anode of said first diode of its associated diode pair and the cathode of said second diode of its associated diode pair,
   i) wherein the cathodes of the first diodes are coupled to the anode of said common uni-directional voltage limiting device, and the anodes of the second diodes are coupled to the cathode of said common unidirectional voltage limiting device,
   j) whereby the rectifying diodes direct current arising from an over voltage transient between a signal input and output port to flow through one of said first and second diodes connected to the signal conductive path between the signal input and output port before reaching the common unidirectional voltage limiting device, the current continuing to flow through one of the first and second ground rectifying diodes before reaching the common ground, thereby isolating other signal conductive paths from the over voltage condition.

2. A circuit for interconnecting low voltage signals and AC power, the circuit comprising:
   a) a signal connection circuit comprising;
      i) a plurality of input ports for receiving low voltage signals,
      ii) a plurality of output ports for transmitting the low voltage signals received at the input ports,
      iii) each of said input ports being connected to a corresponding output port by a separate parallel array of signal conductive paths, each path of the parallel array of signal conductive paths comprising a signal ground path
   b) a power connection circuit comprising
      i) a line input port,
      ii) a neutral input port,
      iii) a ground input port,
      iv) a line output port connected to said line input port,
      v) a neutral output port connected to said neutral input port,
      vi) a ground output port connected to said ground input port,
   c) a common ground connection between the ground connection of the power connection circuit and the signal ground paths of said signal connection circuit,
   d) wherein each the signal ground path in the signal connection circuit are connected to said common ground connection by a voltage limiting device.

3. A circuit for interconnecting low voltage signals and AC power according to claim 2 wherein the signal conductive paths connecting input and output ports in the signal connection circuit are connected to said common ground connection by a second voltage limiting device in parallel connection thereto.

4. A circuit for interconnecting low voltage signals and AC power according to claim 2 wherein the signal connection circuit further comprises a uni-directional voltage limiting device disposed between said voltage limiting device and said common ground connection.

5. A circuit for interconnecting low voltage signals and AC power according to claim 3 further comprising a voltage limiting device in parallel connection between at Least one of the line and neutral ports and ground.

6. A circuit for interconnecting low voltage signals and AC power according to claim 3 wherein a voltage limiting device is disposed between each of the line, neutral and ground ports in a delta circuit.

7. A circuit for interconnecting low voltage signals and AC power according to claim 5 wherein the voltage limiting device in the power connection circuit is an MOV.

8. A circuit for interconnecting low voltage signals and AC power according to claim 6 wherein each voltage limiting device in the power connection circuit is an MOV.

9. A circuit for interconnecting low voltage signals and AC power according to claim 7 further comprising at least one fuse in thermal communication with one or more MOV's.

10. A circuit for interconnecting low voltage signals according to claim 1 wherein at least one of said input and output ports is selected from a group consisting of RCA, VGA, Co-axial cable, phone, data communications and Ethernet type connectors.

11. A circuit for interconnecting low voltage signals and AC power according to claim 2 wherein at least one of said signal input and output ports is selected from a group consisting of RCA, VGA, Co-axial cable, phone, data communications and Ethernet type connectors.

12. A circuit for interconnecting low voltage signals and AC power according to claim 2 further comprising a noise filtering circuit in serial connection between two or more of the power connection circuit input and output ports and operative to prevent AC lines noise from interfering with the quality of A/V equipment receiving AC power therefrom.

13. A circuit for interconnecting low voltage signals and AC power according to claim 12 wherein the noise filtering circuit comprises a first and second capacitors, each connecting the line ports to the neutral ports.

14. A circuit for interconnecting low voltage signals and AC power according to claim 12 wherein at least one of said signal input and output ports is selected from a group consisting of RCA, VGA, Co-axial cable, phone, data communications and Ethernet type connectors.

* * * * *